United States Patent [19]
Tung

[11] 3,919,694
[45] Nov. 11, 1975

[54] CIRCULATING SHIFT REGISTER MEMORY HAVING EDITING AND SUBROUTINING CAPABILITY

[75] Inventor: Chung C. Tung, Santa Clara, Calif.

[73] Assignee: Hewlett-Packard Company, Palo Alto, Calif.

[22] Filed: May 10, 1974

[21] Appl. No.: 468,958

[52] U.S. Cl. .......... 340/172.5; 340/173 RC
[51] Int. Cl.[2] .. G11C 21/00; G11C 9/02; G06F 9/16
[58] Field of Search .......... 340/172.5, 173 RC

[56] References Cited

UNITED STATES PATENTS

| | | | |
|---|---|---|---|
| 3,602,901 | 8/1971 | Jen | 340/172.5 |
| 3,827,028 | 7/1974 | Kashio | 340/172.5 |
| 3,855,461 | 12/1974 | Stockwell | 340/172.5 X |
| 3,863,060 | 1/1975 | Rodé et al. | 235/156 |

*Primary Examiner*—R. Stephen Dildine, Jr.
*Attorney, Agent, or Firm*—F. David LaRiviere

[57] ABSTRACT

A circulating shift register memory used in a hand-held programmable calculator is described in which the informational words of data contained therein are edited by selectively including one-word storage register in or excluding such registers from the circulation path of the memory. The selectable storage elements contain new or discardable data at the time of their inclusion in or exclusion from the circulation path. Logic circuitry for controlling the number of storage elements in the circulation path is responsive to unique control words which share memory space with the information words. The same circuitry and a similar method are used for subroutining in the same memory.

21 Claims, 7 Drawing Figures

FIGURE I

CIRCULATING SHIFT REGISTER MEMORY HAVING EDITING AND SUBROUTINING CAPABILITY

BACKGROUND OF THE INVENTION

Random access memory systems are common in prior art computers and programmable calculators. They permit program editing, but require an address scheme, absolute or relative, to enter data or program instructions at a known location for later retrieval. Absolute addressing involves assigning a unique code to each location in memory where data may be stored. Relative addressing uses codes for locating stored data based on the location in memory from or to which program control is transferred. Program editing in addressable random access memories is cumbersome and requires additional registers and related logic to store and control the address information.

Many prior art programmable calculators have subroutine capability. Most machines having subroutine capability rely on addressing to locate the start of the subroutine in another part of the same memory or in another memory subsystem. Control is then returned via addressing to the original memory location.

Since the stored information in a circulating shift register (CSR) memory is not stationary, addressing uniquely definable locations of such information is impossible. Therefore, prior to the present invention, program editing in a CSR memory was even more cumbersome than for random access memories using an absolute or relative addressing scheme. Stored instructions had to be cleared from memory, edited, then re-entered. Some systems did not require deletion of the entire program but only that part beyond the point in the program where the change was desired. In either case, however, deletion and re-entry of information unaffected by the modification was necessary. Such inconvenience often outweighs the savings resulting from the absence of additional storage registers and control logic for address codes.

SUMMARY OF THE INVENTION

In the preferred embodiment of the present invention, a CSR memory in a hand-held programmable calculator can store up to 100 six-bit words of information data in a 100-word register connected in series with four one-word registers through logic switches to form a data circulation path. Logic circuitry is connected to one of the one-word registers to form a "window" to the data circulation path.

The nominal circulation path always includes the 100-word register and the one-word register to which the logic circuitry is connected. The path of data circulation also normally includes one other of the one-word registers which may be selectively decoupled from the circulation path. The registers always contain, and the logic circuitry is designed to detect, several uniquely coded control words which share memory space with the informational data and instructions also flowing therein.

Microinstructions stored in the read-only memory (ROM) of the calculator are transmitted to a controller in response to commands input by the user via the keyboard. The controller is part of the CSR memory. It decodes the microinstructions and initiates one of several microinstructions in a ROM also included in the CSR memory (referred to as the program storage ROM). Each microinstruction in the program storage ROM is executed by inpupt qualifiers generated by the logic circuitry in response to the coded control words detected thereby for determining which of the storage registers shall be included in the circulation path. The interconnecting logic switches are actuated by switch command signals generated by the controller in response to execution of the microinstruction in the program storage ROM. Thus, the logic switches couple storage registers into and out of the circulation path in response to command signals determined by control words flowing in the circulation path itself.

A principal object of the present invention is to provide a CSR memory within which the contents may be modified, without having to clear the memory of data and re-entering edited data.

Another object of the present invention is to provide a CSR memory with the capability of selectively adding and deleting data therefrom without absolute or relative addressing.

A further object of the present invention is to provide for subroutining in a CSR memory without using absolute or relative addressing.

A still further object is to provide warning indications to the user when the memory is full and when memory control is positioned at the last memory word location.

DESCRIPTION OF THE PREFERRED EMBODIMENT

Figure 1:
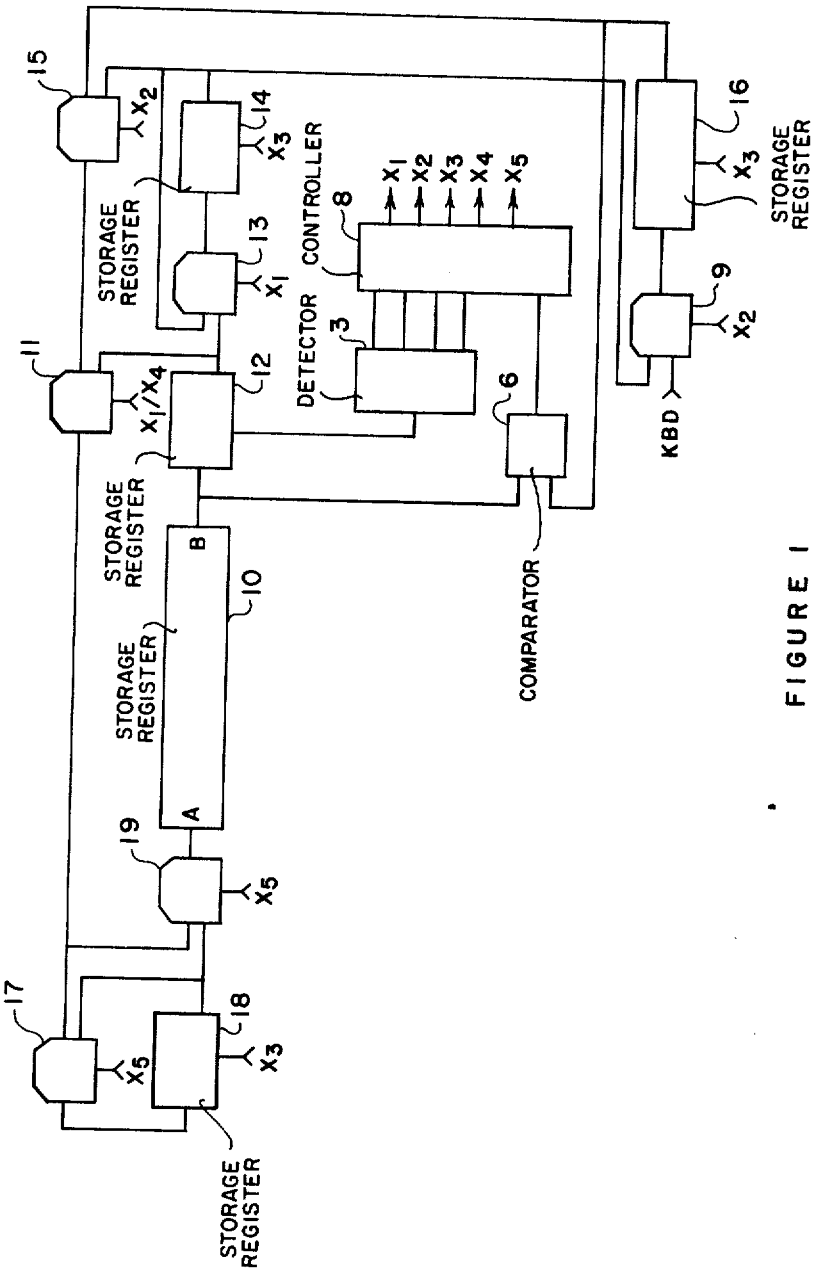
FIG. 1 is a block diagram of a CSR memory according to the preferred embodiment of this invention showing the plurality of storage registers and control logic.

Referring to FIG. 1, there is shown a block diagram of a CSR memory comprising storage registers 10, 12, 14, 16 and 18 coupled in series with SRS's 9, 11, 13, 15, 17 and 19 as shown. Storage register 10 includes 600 dynamic delay elements for containing up to 100 six-bit words at one time and is constructed in substantially the same manner as the MOS circuits described in the copending application entitled "General Purpose Calculator with Capability for Performing Interdisciplinary Business Calculations", Ser. No. 302,371, filed Oct. 30, 1972, by France Rodé et al., and assigned to the assignee hereof, now Pat. No. 3,863,060. Storage registers 12, 14, 16 and 18 are similarly constructed but comprise only six dynamic delay elements for containing one six-bit word of coded information.

Figure 2:
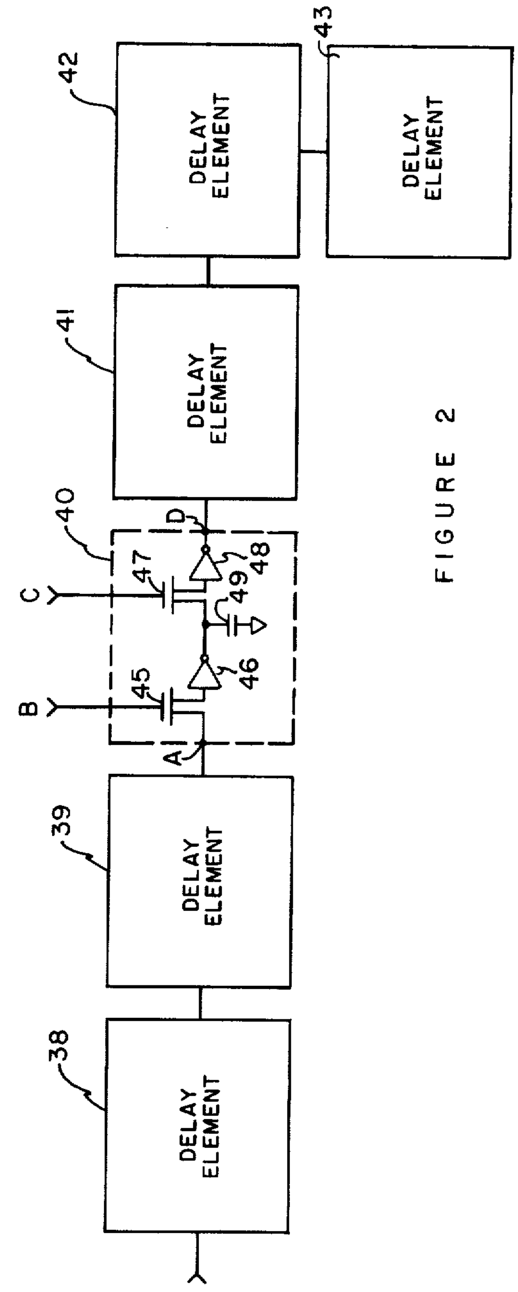
FIG. 2 is a logic diagram of the dynamic delay elements comprising a one-word storage register used in the CSR memory of FIG. 1.

FIG. 2 shows a logic diagram of a dynamic delay element 40 and the interconnection thereof with five more identical delay elements 38, 39, 41, 42 and 43 to form a one-word storage register. Delay element 40 comprises transfer gates 45 and 47, inverters 46 and 48 and capacitor 49 connected as shown. A signal representing a bit of information at input A is gated into inverter 46 when a clock pulse appears at input B. The signal is inverted and capacitor 49 is charged. The informational bit is thus stored until another clock pulse appears at input C, at which time it is inverted again by inverter 48 and transmitted to the next delay element via output D. If the clock pulse at C is inhibited, capacitor 49 will discharge and the bit of information will be lost.

Figure 3:
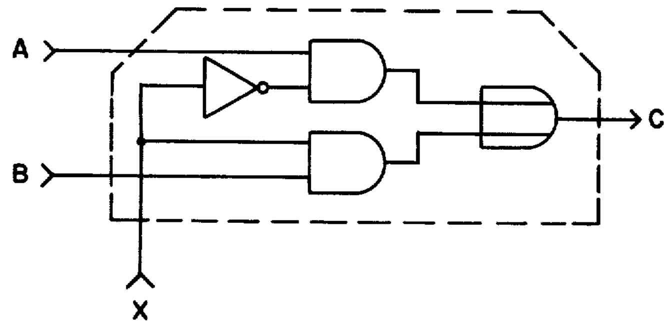
FIG. 3 is a logic diagram of a logic switch (LS) used in the CSR memory of FIG. 1.

As shown in FIG. 3, each LS comprises a combination of gates which provide an output signal in response to three input signals for selecting a particular circulation path according to the logical relation $C = A.X + B.\bar{X}$, where A, B are input signals and X is the switch control signal. Any combination of any presently available logic gates, such as AND, NAND, OR and NOR gates which respond to three inputs according to the above relation can be used for this function.

Figure 4:
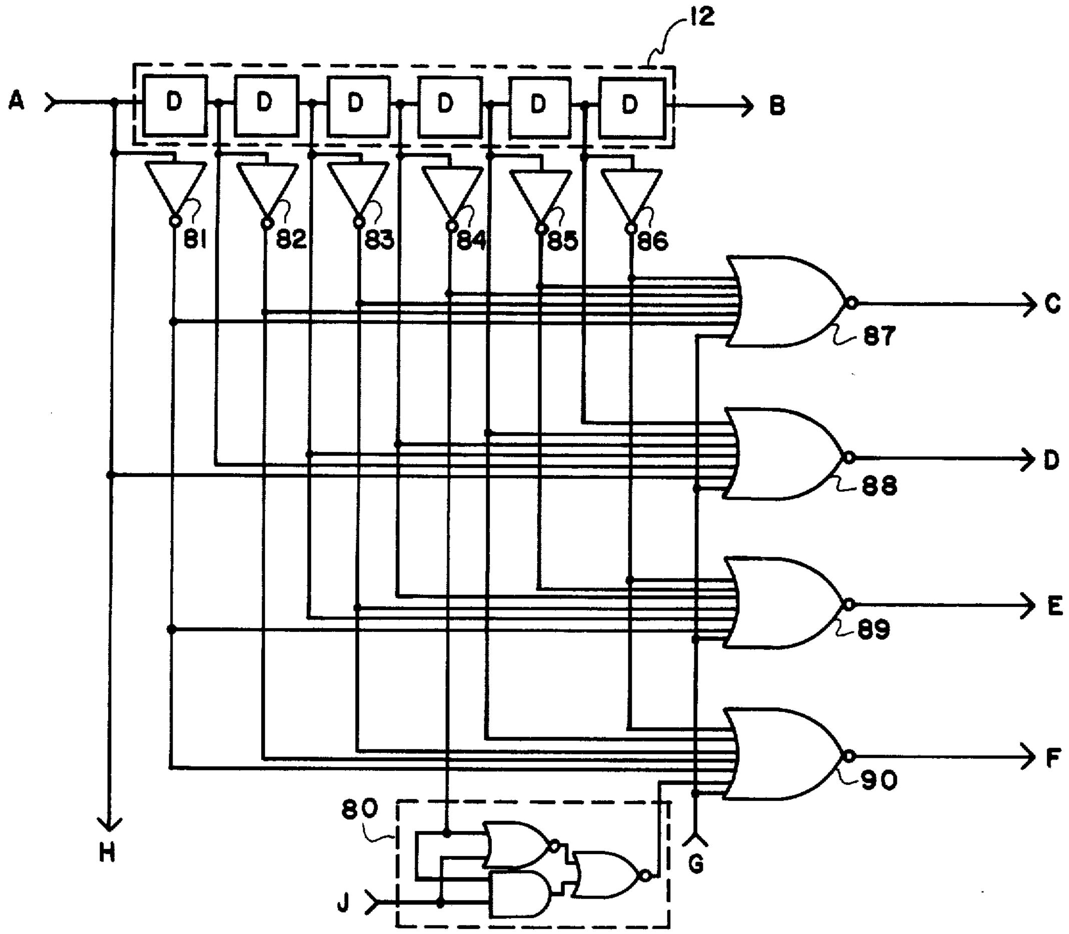
FIG. 4 is a logic diagram of the detector used in the CSR memory of FIG. 1.

Referring again to FIG. 1 the CSR memory control logic includes detector 3, controller 8 coupled to storage register 12, and comparator 6 which is also connected to controller 8 and to output port B of storage register 10. FIG. 4 shows detector 3 which comprises a combination of multi-input logic gates 87, 88, 89, and 90 for detecting each bit of coded six-bit control words which circulate through storage means 12 and provides output signals C, D, E and F to controller 8 in response thereto. These output signals are used as input qualifiers by controller 8, for selectively providing control signals, $X_1$, $X_2$, $X_3$, $X_4$, and $X_5$ to the various LS's as shown in FIG. 1.

Figure 5:
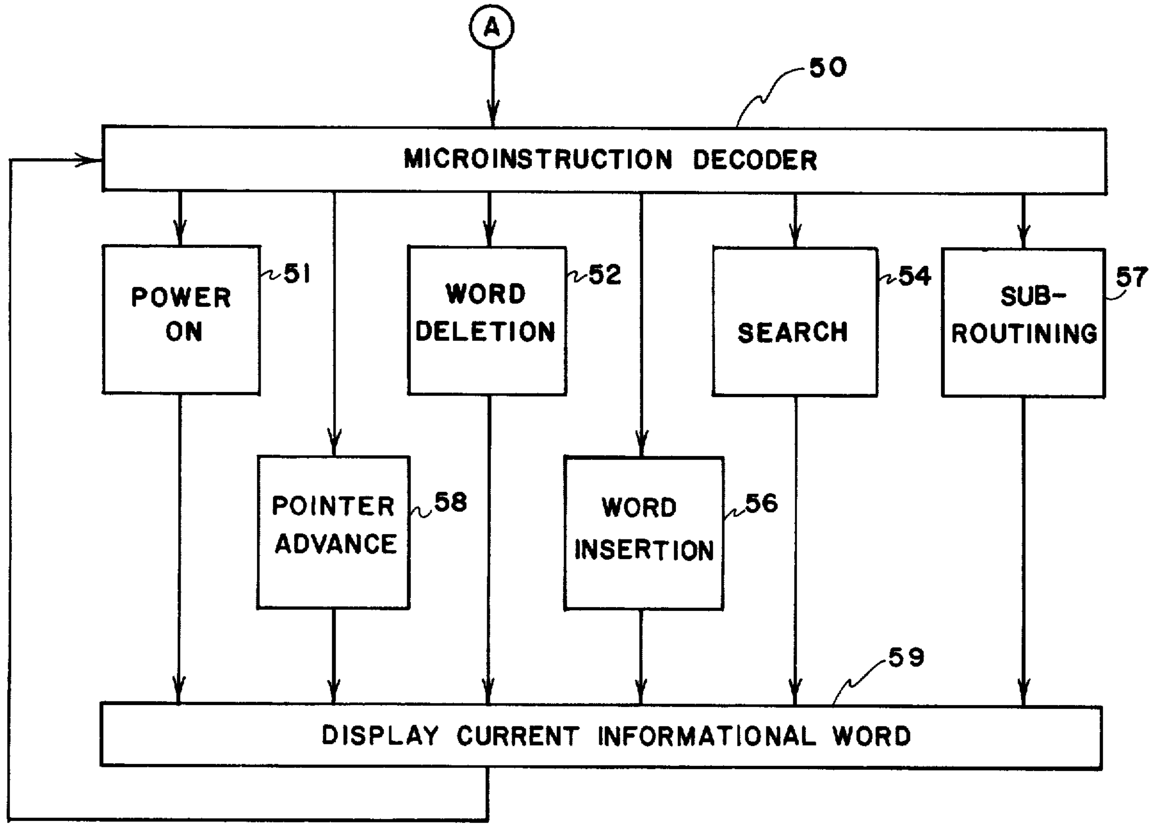
FIG. 5 is a flow diagram of the microinstructions contained in the program storage ROM of the CSR memory of FIG. 1.

Controller 8 of the CSR memory includes a decoder and a program storage ROM which were designed using conventional state machine design techniques. One publication describing the technique is *Designing Logic Systems Using State Machines* by Christopher R. Clare, McGraw-Hill, Inc., 1973. Referring to FIG. 5, microinstructions are received from the calculator ROM at A. These microinstructions are initiated by the user via the keyboard and are decoded by decoder 50. The decoded microinstructions then initialize one of microinstructions 51–59 contained in the program storage ROM. Execution of one of the microinstructions 51–59 is initiated by an input qualifier generated by and received from detector 3 in response to a circulating control word. A command signal to be applied to the X-input of one or more interconnecting logic switches is generated by controller 8 in response to the executed microinstruction contained in the program storage ROM.

Figure 6:
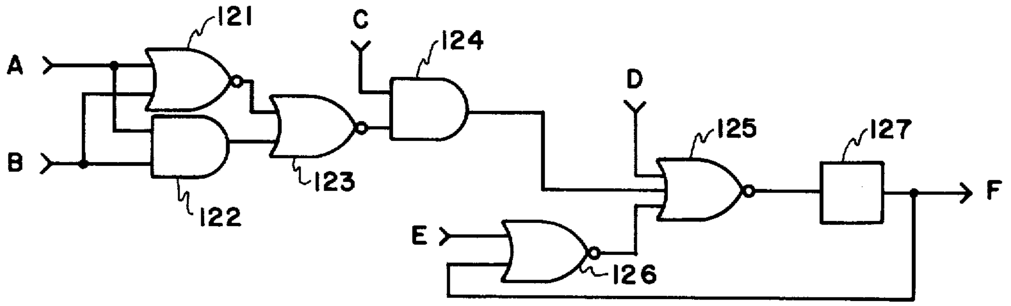
FIG. 6 is a logic diagram of the serial comparator used in the CSR memory of FIG. 1.

As shown in FIG. 6, comparator 6 includes gates 121, 122 and 123 which comprise an exclusive OR circuit wherein the output assumes a high state if one and only one input is provided a high state. Gates 124, 125 and 126 control the state of flip-flop (ff) 127. Since each word is 6-bits long, the comparator actually conducts six separate comparisons for two words applied to inputs A and B. If the state of ff 127 remains the same during the 6-bit comparison, the words are the same; if at any time during the comparison the state of ff 127 changes, the words must be different. The operation of the comparator in the CSR memory according to the present invention is discussed in greater detail later in this specification.

Figure 7:
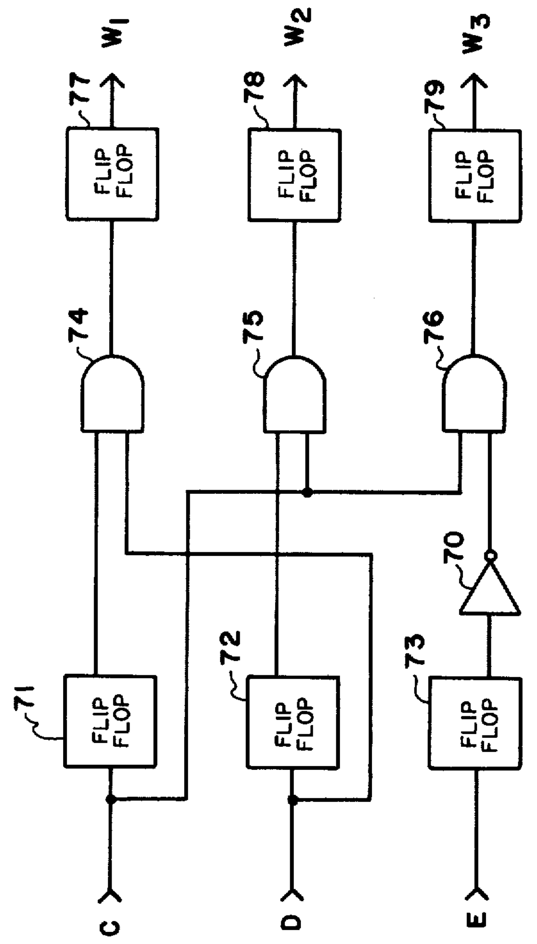
FIG. 7 is a logic diagram of a system used in the CSR memory of FIG. 1 for providing signals to indicate when the memory is full and when the pointer is at the last word location in the memory.

In the CSR memory according to the present invention, the last word stored therein, i.e. the first one entered, is lost when the memory is full and another word is entered. Therefore, a warning system is included for producing signals to indicate when the memory is full. Referring to FIG. 7, this warning system also provides signals for indicating when the pointer, a control word which is described below, is positioned at the last informational word location in the memory. The warning system comprises ff's 71, 72 and 73 which receive signals from the output of detector 8 (see FIG. 4) and ff's 77, 78, and 79 which are controlled by gates 74, 75 and 76 as shown. While any arrangement for providing the same warning signals could be used, in the preferred embodiment of this invention, $w_1$ is used internally to indicate that the memory is empty and word deletions are prohibited; $w_2$ initiates an output indication to the user that the memory is full and that additional entries will cause loss of first-entered words; and $w_3$ initiates an output indication to the user that the memory is full and that the pointer is pointing to the last word position in the memory.

In operation, coded informational words including uniquely coded control words flow through storage registers 10, 12 and 14 to form a normal circulation path. The informational words, which may include data and program instructions, are entered into the path via storage register 16. Several but not all control words are stored in various registers when power is first applied to the memory system as described below.

Referring again to FIGS. 1 and 5, the delay elements may contain residual coded informational words or parts thereof which must be cleared when power is first applied. Residue code is cleared and uniquely-coded, six bit "marker", "pointer", and "secondary pointer" control words are stored in storage registers 16,14 and 18 respectively, according to power-on microinstruction 51. The marker serves as a reference point in the series of informational words circulating in the memory. The pointer acts as a cursor to select specific locations in the circulating series of informational words without addressing. Finally, the secondary pointer is used in subroutining program instructions and is further described later in this specification. Other control words, each also uniquely-coded and six bits long, are entered through storage register 16 when required for subroutining. After the control words are stored, the memory circulates once through all storage registers and then settles into the normal circulation path when the marker word flows into register 14 from register 12.

Control words share memory space with informational words. The pointer "points" to the word it follows in the circulation path when it is in register 12 and the word is in register 14. While the pointed-out word is in register 14, it is copied into register 16 in response to microinstruction 59 to provide a coded indication thereof as the current informational word or program step for the convenience of the user. When an informational word is added, the pointer is automatically moved backward along the circulation path the length of one word as described later in this specification, thus pointing to it as the current informational word. When a word is deleted, the pointer moves forward along the path so as to point to the word preceding the deleted word. Since all words following the pointer move with it as it shifts along the circulation path, in the case of a word deletion a word loaction at the end of the memory path becomes open and is filled with a NO-operation (NO-OP) code. NO-OP code generation is described later in this specification.

Incremental movement of the pointer from one word position to the next in the circulation path may be initiated from the keyboard by the user via a microinstruction from the calculator ROM. Microinstruction 58 is executed when the pointer is detected in register 12 by detector 3. Thereafter the pointer flows into register 14 and in response to executed microinstruction 58 controller 8 provides control signal $X_1$ to LS's 11 and 13 which decouple register 14 for the time it takes one word to flow from register 12 to input port A of register 10 through LS's 11 and 19. When the control signal is released, the pointer re-enters the circulation path from register 14 to point the word which now precedes it in the word flow. When the pointer is next detected in register 12, the word preceding it in register 14 is copied into register 16 to be coded for display purposes as the current information word in accordance with microinstruction 59. Thus, instead of actually "moving the pointer" relative to the contents of the memory, the pointer is isolated from the nominal circulation path while the contents of the memory move relative to the pointer.

The current informational word is displayed to the user in the form of a key code for the key just depressed. The format, initiation and interpretation of these key codes are described in two copending applications: "Calculator with Key Code Association and Display Features", Ser. No. 393,081, filed on Aug. 30, 1973, by Richard Kent Stockwell, now Pat. No. 3,855,461, and "A Calculator Having Merged Key Codes", Ser. No. 425,341, filed on Dec. 17, 1973, by Thomas E. Osborne and Richard Kent Stockwell. Both copending applications are assigned to the assignee hereof.

Editing the contents of memory involves insertions and deletions. In the preferred embodiment of the invention, the user finds the desired location to insert a new informational word by incrementing the pointer according to the process described above. The new informational word, is entered into register 16 via the keyboard. Microinstruction 56 is executed when the pointer is detected in register 12 by detector 3, then allowed to flow into register 14. LS's 9 and 15 are enabled by control signal $X_2$ from controller 8 in response to executed microinstruction 56 which couples register 16 into the circulation path. The pointer flows into register 16 as the new informational word enters the path therefrom, initially passing through LS's 15, 11 and 19 and into input port A of register 10. The circulation path includes register 16 until the marker appears in register 12. Upon detection of the marker by detector 3, control signal $X_2$ is released according to microinstruction 59 after the marker is allowed to flow into register 14. Release of control signal $X_2$ decouples register 16 and restores the length of the circulation path to include registers 10, 12 and 14 only. Thus, the last word in the path, if any, is left in register 16. The current informational word in register 14 then replaces that last word in register 16 when the pointer is next detected in register 12. Coded display of the current informational word is then provided to the user based on the contents of register 16 according to microinstruction 59.

To delete an informational word in the preferred embodiment of the invention, the user locates the word in the same manner as described above for insertions. The memory continues to circulate normally until the pointer is detected in register 12 by detector 3. In response to the pointer word, microinstruction 52 is executed and controller 8 provides control signal $X_4$ to LS 11. LS 11 shortens the circulation path by decoupling the register 14 which now contains the word to be deleted. The word in register 14 is replaced by a NO-OP code. The shortened circulation path continues until the marker is detected in register 12 by detector 3 at which time control signal $X_4$ is released according to microinstruction 57 and LS 11 is disabled, thus restoring register 14 to the circulation path. When the pointer next appears in register 12, register 16 is then loaded with the word before the deleted word for display to the user in accordance with microinstruction 59.

The delay elements comprisinig each of the registers of the preferred embodiment of the present invention must be refreshed, i.e. bits of information must continually circulate through the elements, to preserve the information they contain. Referring again to FIG. 2, if the elements are not refreshed, i.e. the clock pulse at C inhibited, each element decays to a "zero state" until new information is entered. When the delay elements of a one-word register are not refreshed and are allowed to sag to the zero state, a NO-OP code is said to be "generated".

The delay elements must also be refreshed when a control or other informational word is isolated and "stored" in register 14 or entered into and stored in register 16 for operations such as pointer advance or word insertion. Referring again to FIG. 1, the output of each of these registers is coupled back to their respective inputs through LS's 13 and 9, respectively, during such operations. Thus the register is said to be "self-looping", since the same information is gated into each delay element in the same manner as described above in the description of FIG. 2.

A user's program frequently will involve the same calculation or operation more than once during its run. Subroutines are specifically identifiable, labelled programs, callable by a principal program to perform recurring operations. They are used to save memory space since the same program code need not be entered into memory more than once. For example, in the calculation $$Y = \sqrt{a^2 + b^2 + c^2},$$

the variables $a$, $b$, and $c$ can be determined by another complex function for different data such $$\frac{1 + \sin x}{x}.$$

Without subroutining, $$\frac{1 + \sin x}{x}$$

would have to be entered into memory three times for this calculation. With subroutining, it need be entered only once and called by the principal program three times.

In the preferred embodiment of this invention, a subroutine is entered in the following format:

*LBL* } subroutine identifier
*A*

ENTER } SUBROUTINE
$\frac{1 + \sin x}{x}$

*RTN* } SUBROUTINE ENDED; return to principal program

Subroutining is provided by using additional, uniquely-coded control words for transferring program control from the principal program to the subroutine and back again to the principal program. However, program control cannot be transferred without maintaining a reference to assure that control is restored to the proper location in the principal program. Therefore the pointer becomes the reference in the principal program and a secondary pointer, contained in register 18, is used to execute a subroutine when called as described below.

A subroutine may be called by the user via a microinstruction from the calculator ROM upon entry of the identifier word, e.g. "A", into register 16. Microinstruction 57 is then executed when the marker word is detected in register 12 by detector 3 and detector 3 is enabled to detect the secondary pointer rather than the pointer. Mutual exclusive detection of the pointer or secondary pointer is implemented by exclusive OR circuit 80 shown in FIG. 4.

The memory continues to circulate two more words before LS's 17 and 19 are enabled by control signal $X_5$ from controller 8 to introduce register 18, which contains the secondary pointer, into the circulation path. The secondary pointer now follows the marker word in the circulation path. The secondary pointer is stored immediately thereafer in register 14 by the same means as described above for incrementing the pointer.

Referring again to FIG. 5 and while the circulation path includes registers 10, 12 and 18 only, microinstruction 54 is executed upon detection of the LBL word by detector 3. Serial comparator 6 then compares the identifier word A stored in register 16 with the word next exiting register 10 at output port B. If they are the same, register 14 is coupled into the circulation path after circulation continues two more words. The secondary pointer now follows the identifier word in a circulation path comprising registers 10, 12, 14 and 18. Since detector 3 is enabled to recognize the secondary pointer only, program control has been transferred to the subroutine and the pointer has remained in the principal program to provide the reference for return of program control thereto. When the secondary pointer next appears in register 12 and is detected by detector 3, register 16 is then loaded with the word contained in register 14 for display to the user in accordance with microinstruction 59.

If the words do not compare, then the search for another LBL word is continued and the comparison process repeated. If no match is found after a search of the contents of the entire memory, the marker is then detected in register 12 by detector 3. Thereafter, register 14 is coupled into the circulation path, and when the secondary pointer is contained in register 18, that register is decoupled by release of control signal $X_5$ from controller 8. The normal circulation path is resumed and detector 3 is restored to normal operation so that it detects the pointer instead of the secondary pointer.

Assuming program control has been shifted to a subroutine, completion thereof is signaled by detection of the RTN word which has been entered into the CSR memory with the program. The secondary pointer is stored in register 18, the normal circulation path and detector 3 operation are restored as described above for the case of non-matching identifier words. Thus program control has been re-vested in the pointer and thereby transferred back to the principal program. The word contained in register 14 is displayed to the user in accordance with microinstruction 59 as described above when the pointer next appears in register 12.

I claim:

1. A circulating shift register memory for storing coded informational words, comprising:

a plurality of storage registers, each having an input port for receiving and an output port for transmitting informational words, coupled in series to form a circulation path for circulating informational words therein;

circulation means for causing circulation of informational words in the circulation path, to maintain the storage of the informational words in the storage registers;

detecting means having output ports and an input port coupled to one of the storage registers for producing a control signal at one of the output ports in response to detection of uniquely coded informational words at the input port as they circulate through said storage register; and a plurality of switching means, each having input and output ports, through which the storage registers are coupled, one of the input ports also being coupled to one of the output ports of the detecting means for receiving a control signal to selectively couple at least one of the storage registers to the circulation path or decouple one of the storage registers from the circulation path in response thereto when the storage register contains an informational word.

2. A circulating shift register memory as in claim 1 wherein:

the plurality of storage registers includes storage means for storing microinstructions; and the detecting means produces the control signal in response to the microinstructions stored in the storage means.

3. A circulating shift register memory as in claim 1 wherein:

the storage registers include a first storage register having an input port for serially receiving and an output port for serially transmitting a plurality of informational words; a second storage register having an input port coupled to the output port of the first storage register for serially receiving an informational word therefrom, one output port for transmitting that word, and another output port coupled to the input port of the detecting means for detection of uniquely coded informational words circulating therethrough; and a third storage register having an input port coupled to said one output port of the second storage register for receiving an informational word therefrom and an output port coupled to the input port of the first storage register for transmitting that word thereto; and the circulation means is operable for selectively terminating the circulation of informational words through the storage registers for causing loss of stored informational words and for causing the storage register to assume a zero state of operation, said zero state of operation also being coded as an informational word.

4. A circulating shift register memory as in claim 3 for use in a programmable electronic calculator wherein:

the informational words include program instruction words and the uniquely coded informational words are memory control words;

the third storage register initially stores a first memory control word effective for causing program control to be located at the program instruction word it follows in the circulation path;

the switching means further include a first switching means through which the second and third storage registers are coupled, a second switching means through a first input port of which the output port of the third storage register is coupled to the input port of the first storage register, and through a second input port of which the output port of the second storage register may be coupled to the input port of the first storage register; and the detecting means increments program control from one program instruction word to another by applying a control signal to the first and second switching means in response to detection of the first memory control word to decouple the third storage register from the circulation path when the first memory control word is stored therein, and by terminating that control signal after one informational word circulates into the first storage register to couple the third storage register back into the circulation path.

5. A circulating shift register memory as in claim 4 wherein:

the storage registers further include a fourth storage register through which the output port of the third storage register may be coupled to the input port of the first storage register for initially storing a second memory control word effective for establishing a reference among the circulating informational words in the circulation path, and for storing informational words to be entered into or deleted from the memory;

the switching means further includes a third switching means through a first input port of which the output port of the fourth storage register is coupled to the first input port of the second switching means and through a second input port of which the output port of the third storage register is also coupled to the first input port of the second switching means, and a fourth switching means through a first port of which the input port of the fourth storage register may be coupled to the output port of the third storage register and through a second input port of which informational words may be entered into the memory;

the detecting means includes insertion means for entering informational words into the circulation path by applying a control signal to the third and fourth switching means in response to detection of the first memory control word to couple the fourth storage register containing the informational word to be entered into the circulation path, when the first memory control word is stored in the third storage means, and by terminating that control signal in response to detection of the second memory control word to decouple the fourth storage register from the circulation path when the second memory control word is stored in the third storage register; and the detecting means further includes deletion means for deleting informational words from the circulation path by applying a control signal to the second switching means in response to detection of the first memory control word to decouple the third storage register containing the informational word to be deleted from the circulation path when the first memory control word is stored in the second storage register, and by terminating that control signal in response to detection of the second memory control word to couple the third storage register into the circulation path after the circulation means causes the zero state of operation thereof.

6. A circulating shift register memory as in claim 5 wherein the memory further includes means for providing display of a coded representation of the informational word stored in the fourth storage register to indicate the current location of program control, said last-mentioned means being effective for entering that word into the fourth storage register from the third storage register upon the next detection of the first memory control word after the third register is coupled into the circulation path.

7. A circulating shift register memory as in claim 6 wherein:

the plurality of storage registers includes storage means for storing microinstructions; and the last-mentioned means enter the word into the fourth storage register in response to a microinstruction stored in the storage means.

8. A circulating shift register as in claim 5 having subroutining capability wherein:

a subroutine identifier word is entered into the fourth storage register;

the plurality of storage registers further includes a fifth storage register through which the output port of the fourth storage register may be coupled to the input port of the first storage register for initially storing a third memory control word effective for causing program control to be transferred from the program instruction word it follows in a principal program to the program instruction word it follows in a subroutine;

the switching means further includes a fifth switching means through which the output port of the second switching means may be coupled to the fifth storage register, and a sixth switching means through a first input port of which the output port of the fifth storage register is coupled to the input port of the first storage register and through a second input port of which the output port of the second switching means is coupled to the input port of the first storage register; and the detecting means includes subroutining means for transferring program control from a principal program to a subroutine having first and second subroutine control words by applying a control signal to the fifth and sixth switching means in response to detection of the second memory control word to couple the fifth storage register containing the third memory control word into the circulation path so that the third memory control word follows the second memory control word; by enabling the detecting means to detect the third memory control word rather than the first memory control word, said detecting means thereafter applying a control signal to the first and second switching means in response to detection of the third memory control word to decouple the third storage register from the circulation path when the third memory control word is stored therein; by comparing the subroutine identifier word in the fourth storage register with the informational word following the first subroutine control word in the circulation path upon detection thereof; and by terminating the control signal applied to the first and second switching means, when the informational word following the first subroutine control word in the circulation path matches the subroutine identifier word in the fourth storage register, to couple the third storage register containing the third memory control word back into the circulation path, said third memory control word being effective for locating program control at the informational word it follows in the subroutine;

said subroutining means also being effective for restoring program control to the principal program.

9. A circulating shift register memory as in claim 8 wherein the subrouting means is effective for restoring program control to the principal program by terminating the control signal applied to the fifth and sixth switching means in response to detection of the second subroutine control word by the detecting means to decouple the fifth storage register from the circulation path when the third memory control word is stored therein; and by enabling the detecting means to detect the first memory control word rather than the third memory control word for locating program control at the informational word which the first memory control word follows in the principal program.

10. A circulating shift register memory as in claim 9 wherein the memory further includes means for providing display of a coded representation of the informational word stored in the fourth storage register to indicate the current location of program control, said last-mentioned means being effective for entering the word into the fourth storage register from the third storage register upon the next detection of the first memory control word after the third storage register is coupled into the circulation path.

11. A circulating shift register memory as in claim 10, wherein:

the plurality of storage registers includes storage means for storing microinstructions; and the last-mentioned means enter the word into the fourth storage register in response to a microinstruction stored in the storage means.

12. A circulating shift register memory as in claim 8 wherein the memory further includes means for providing display of a coded representation of the informational word stored in the fourth storage register to indicate the current location of program control, said last-mentioned means being effective for entering the word into the fourth storage register from the third storage register upon the next detection of the third memory control word after the third register is coupled into the circulation path.

13. A circulating shift register memory as in claim 12 wherein:

the plurality of storage registers includes storage means for storing microinstructions; and the last-mentioned means enter the word into the fourth storage register in response to a microinstruction stored in the storage means.

14. A circulating shift register memory as in claim 8 wherein:

the plurality of storage registers includes storage means for storing microinstructions; and the subroutining means transfers program control in response to the microinstructions stored in the storage means.

15. A circulating shift register memory as in claim 5 wherein:

the plurality of storage registers includes storage means for storing microinstructions; and the insertion and deletion means enter and delete informational words, respectively, in response to the microinstructions stored in the storage means.

16. A circulating shift register memory as in claim 4 wherein:

the plurality of storage registers includes storage means for storing microinstructions; and the detecting means increments program control in response to the microinstructions stored in the storage means.

17. A circulating shift register memory as in claim 4 wherein:

the plurality of storage registers includes storage means for storing microinstructions; and the memory further includes means responsive to microinstructions stored in the storage means for providing display of a coded representation of the informational word which the first memory control word follows in the circulation path, said display indicating the current location of program control.

18. A circulating shift register memory as in claim 17 wherein the detecting means further includes means for prohibiting deletion of informational words when there are no program instructions in the circulation path and warning means for providing the user a visual indication when the circulation path is full of informational words and insertion of additional informational words will cause loss of first-entered informational words, and when the circulation path is full of informational words and the first memory control word is located at the first informational word entered.

19. A circulating shift register memory as in claim 17 wherein the detecting means includes warning means for providing the user a visual indication when the circulation path is full of informational words and insertion of additional informational words will cause loss of first-entered words.

20. A circulating shift register memory as in claim 17 wherein the detecting means includes warning means for providing the user a visual indication when the circulation path is full of informational words and the first memory control word is located at the first informational word entered.

21. A circulating shift register memory as in claim 17, wherein the detecting means includes means for prohibiting deletion of informational words when there are no program instructions in the circulation path.

* * * * *

UNITED STATES PATENT AND TRADEMARK OFFICE

CERTIFICATE OF CORRECTION

PATENT NO. : 3,919,694

DATED : November 11, 1975

INVENTOR(S) : Chung C. Tung

It is certified that error appears in the above-identified patent and that said Letters Patent are hereby corrected as shown below:

Column 2, line 2, "inpupt" should read -- input --;

Column 3, lines 16-17, "A.X" should read -- A·X -- and "B.$\overline{X}$" should read -- B·$\overline{X}$ --;

Column 4, line 36, after "14" insert -- , --;

Column 6, line 52, after "such" insert -- as --;

Column 11, line 28, "subrouting" should read -- subroutining --.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*